(12) United States Patent
Andreoni et al.

(10) Patent No.: US 12,154,185 B2
(45) Date of Patent: Nov. 26, 2024

(54) SYSTEM AND METHOD FOR VERIFYING POSITIONAL AND SPATIAL INFORMATION USING DEPTH SENSORS

(71) Applicant: Datalogic IP Tech S.r.l., Lippo di Calderara di Reno (IT)

(72) Inventors: Gildo Andreoni, Fanano (IT); Matteo Selvatici, Imola (IT); Mohammad Arrfou, Bologna (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 201 days.

(21) Appl. No.: 17/645,729

(22) Filed: Dec. 22, 2021

(65) Prior Publication Data

US 2023/0196495 A1    Jun. 22, 2023

(51) Int. Cl.
*G06T 1/00* (2006.01)
*B25J 9/16* (2006.01)
(Continued)

(52) U.S. Cl.
CPC .......... *G06T 1/0014* (2013.01); *B25J 9/1676* (2013.01); *G06F 18/251* (2023.01); *G06T 7/20* (2013.01);
(Continued)

(58) Field of Classification Search
CPC ......... G06T 1/0014; G06T 2207/30164; G06T 2207/30244; G06T 2207/10028;
(Continued)

(56) References Cited

U.S. PATENT DOCUMENTS 11,717,964 B2    8/2023  Muneto et al.
2011/0032341 A1*  2/2011  Ignatov ............... H04N 13/144
                                                            348/42
(Continued)

FOREIGN PATENT DOCUMENTS

EP    2819109 A1    12/2014
EP    1635107 B2    1/2016
EP    3654125 A1    5/2020

OTHER PUBLICATIONS

European Patent Office, Extended European Search Report in European Patent Application No. 22215564.0, mailed Sep. 19, 2023, 16 pages.

(Continued)

*Primary Examiner* — Jason Holloway
*Assistant Examiner* — Benjamin J Brosh
(74) *Attorney, Agent, or Firm* — Stoel Rives LLP

(57) ABSTRACT

The disclosure relates to a system and method for verifying robot data that is used by a safety system monitoring a workspace shared by a human and robot. One or more sensors monitoring the workspace are arranged to obtain a three-dimensional view of the workspace. Raw data from each of the sensors is acquired and analyzed to determine the positioning and spatial relationship between the human and robot as both move throughout the workspace. This captured data is compared to the positional data obtained from the robot to assess whether discrepancies exist between the data sets. If the information from the sensors does not sufficiently match the data from the robot, then a signal from the system may be sent to deactivate the robot and prevent potential injury to the human.

20 Claims, 9 Drawing Sheets

(51) Int. Cl.
*G06F 18/25* (2023.01)
*G06T 7/20* (2017.01)
*G06T 7/50* (2017.01)
*G06T 7/70* (2017.01)
*G06T 7/80* (2017.01)
*G06T 15/00* (2011.01)
*G06V 10/22* (2022.01)
*G06V 10/75* (2022.01)
*G06V 10/762* (2022.01)
*G06V 20/52* (2022.01)
*G06V 20/64* (2022.01)

(52) U.S. Cl.
CPC .................. *G06T 7/50* (2017.01); *G06T 7/70* (2017.01); *G06T 7/80* (2017.01); *G06T 15/00* (2013.01); *G06V 10/22* (2022.01); *G06V 10/751* (2022.01); *G06V 10/762* (2022.01); *G06V 20/52* (2022.01); *G06V 20/653* (2022.01); *G06T 2207/30164* (2013.01); *G06T 2207/30244* (2013.01)

(58) Field of Classification Search
CPC .... B25J 9/1676; G06F 18/251; G06V 10/751; G06V 20/653; G05B 2219/40202
See application file for complete search history.

(56) References Cited

U.S. PATENT DOCUMENTS

| | | |
|---|---|---|
| 2014/0277723 A1 | 9/2014 | Nishimura et al. |
| 2016/0214255 A1* | 7/2016 | Uhlenbrock ........... B25J 9/1674 |
| 2018/0157230 A1 | 6/2018 | Matsushima |
| 2018/0222050 A1 | 8/2018 | Vu et al. |
| 2018/0222051 A1 | 8/2018 | Vu et al. |
| 2018/0222052 A1 | 8/2018 | Vu et al. |
| 2019/0105779 A1 | 4/2019 | Einav |
| 2020/0073358 A1* | 3/2020 | Dedkov ................. B25J 9/1666 |
| 2020/0078948 A1* | 3/2020 | Krause ................... G06F 3/017 |
| 2020/0290205 A1 | 9/2020 | Hammes et al. |
| 2020/0331146 A1 | 10/2020 | Vu et al. |
| 2020/0331155 A1 | 10/2020 | Vu et al. |
| 2020/0398433 A1* | 12/2020 | Kelly ..................... B25J 13/085 |
| 2021/0053224 A1 | 2/2021 | Schroeder et al. |
| 2021/0053227 A1 | 2/2021 | Wartenberg et al. |
| 2021/0260770 A1 | 8/2021 | Vu et al. |
| 2021/0370510 A1* | 12/2021 | Mao ....................... B25J 13/086 |
| 2022/0176560 A1 | 6/2022 | Akagi et al. |
| 2023/0196495 A1 | 6/2023 | Andreoni et al. |
| 2023/0202037 A1 | 6/2023 | Andreoni et al. |

OTHER PUBLICATIONS

Miseikis et al, "Multi 3D Camera Mapping for Predictive and Reflexive Robot Manipulator Trajectory Estimation", Cornell University Library, Oct. 12, 2016, XP081152218, DOI: 10.1109/SSCI.2016.7850237.

European Patent Office, Extended European Search Report in European Patent Application No. 22216742.1, mailed May 24, 2023, 9 pages.

Ebert, et al. "Safe Human-Robot-Cooperation: Problem Analysis, System Concept and Fast Sensor Fusion", Embedded Systems and Robotics Lab (RESY) at the University of Kaiserslautern, Germany, Aug. 20-22, 2001, 6 pages.

Flacco et al. "A Depth Space Approach to Human-Robot Collision Avoidance", IEEE International Conference on Robotics and Automation, May 14-18, 2012, 8 pages.

Sobalvarro, Patrick, A Closer Look at a Safety-Certified Vision System for Human-Robot Collaboration, International Robot Safety Conference, Sep. 22, 2021, 18 pages.

* cited by examiner

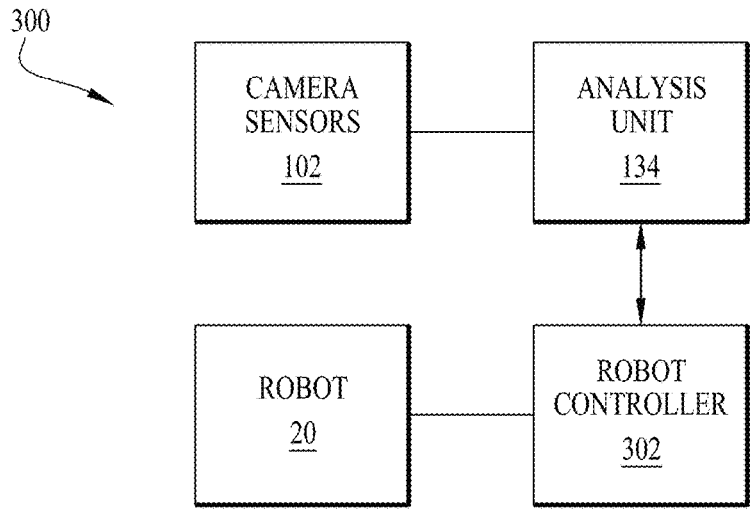
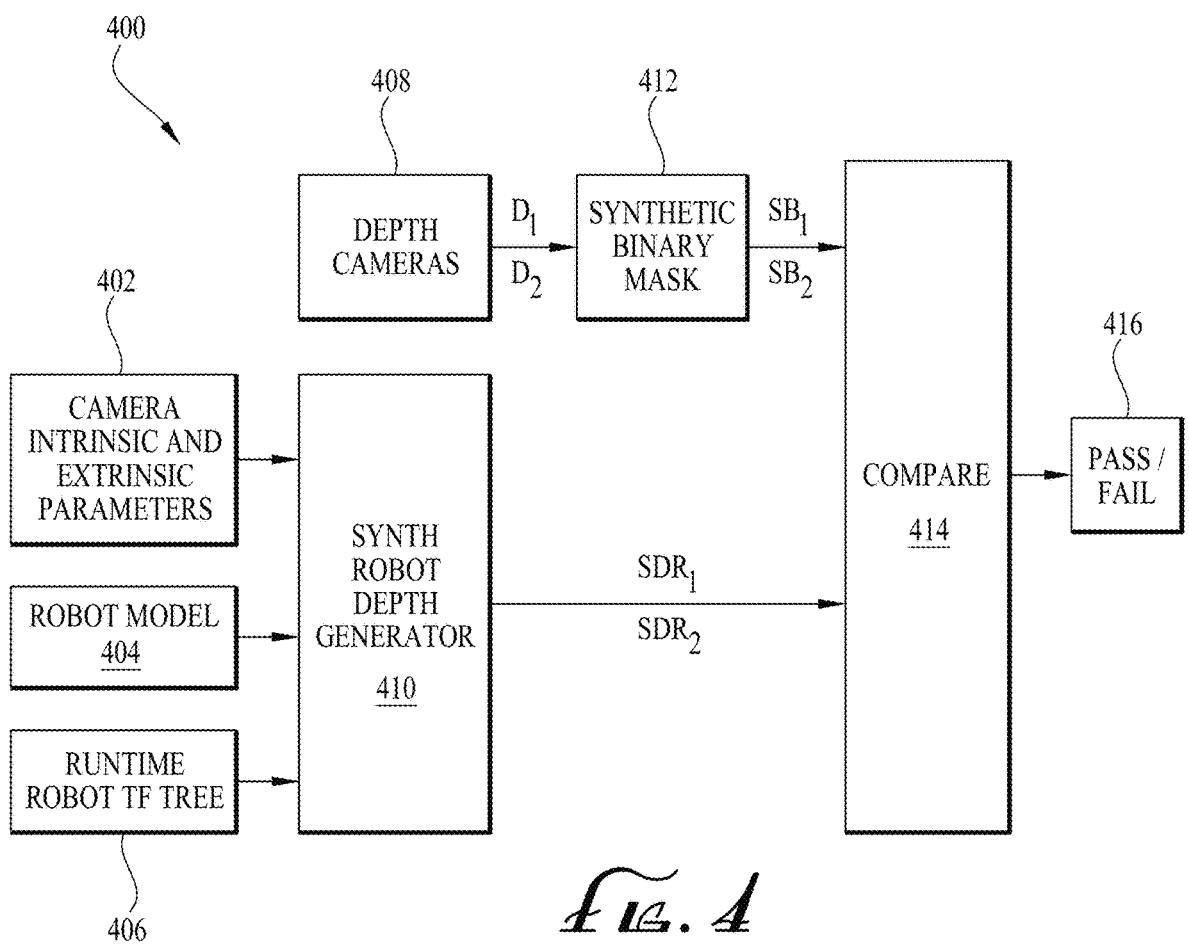

(RGB IMAGE FROM CAMERA 1)

(RGB IMAGE FROM CAMERA 2)

(DEPTH MAP $D_1$ FROM CAMERA 1)

(DEPTH MAP $D_2$ FROM CAMERA 2)

(SYNTHETIC DEPTH MAP SDR$_1$)

(SYNTHETIC DEPTH MAP SDR$_2$)

(ROBOT MASK SB$_1$)

(ROBOT MASK SB$_2$)

(OVERLAYED OCCUPANCY MAPS - VMR AND SVMR)

SYSTEM AND METHOD FOR VERIFYING POSITIONAL AND SPATIAL INFORMATION USING DEPTH SENSORS

INFORMATION ON EU FUNDING

The project leading to this application has received funding from the European Union's Horizon 2020 research and innovation programme under grant agreement No. 818087.

BACKGROUND

The present disclosure relates generally to systems and methods for monitoring a shared workspace to ensure the safety of a human working closely with dangerous machinery, such as a robot. In particular, the disclosure relates to systems and methods for verifying the accuracy of data received from the machinery to ensure the data is reliable for use in developing proper safety protocols for monitoring the workspace.

Many industries have long relied on industrial robots and other automated equipment to complete various tasks in a safe and efficient manner. To ensure the safety of nearby human workers, this equipment is typically isolated or deployed in separate workspaces and positioned behind fences or other protective barriers. In some industries, humans and robots can work effectively in this manner, so these isolation methods do not impact overall performance. However, in other environments, there is a substantial benefit derived from the synergy of having humans and robots coexisting and working together in a shared workspace. For such arrangements to function properly and realize the impact of a joint human and robot workforce, fences or other physical barriers are ineffective since they would inhibit some or all interaction between the human and robot. Accordingly, other safety measures are required to ensure human safety in the shared workspace is maintained while also fostering a productive environment.

To this end, various virtual barriers have been designed for controlling the actions of the robot (or other automated machine) when the conditions may pose an elevated risk to human safety. For example, in some configurations, an optical sensor system including one or more light emitters and detectors creates a light curtain that defines the boundaries of a safety or exclusion zone between the human and robot. When the optical sensors detect the presence of the human near or within the exclusion zone, the system slows down or deactivates the robot to prevent potential injury to the human. While these sensor systems are relatively low cost and easy to configure, the exclusion zone defined by the light curtain is often static and exists in a two-dimensional space. Because of these limitations, the system lacks overall precision and is difficult to adapt to a dynamic workplace where the human and robot may be constantly moving, or where the robot moves through a series of wide-ranging trajectories. Moreover, these configurations typically require defining an exclusion zone with a large safety margin to ensure early detection of potential intrusions in the exclusion zone.

Some more recent designs have shifted to the use of three-dimensional optoelectronic sensors or other suitable equipment able to monitor three-dimensional space, such as stereo cameras and time-of-flight cameras. This technology may be used to define a three-dimensional exclusion zone that accurately captures relative distance between the human and robot while one or both are moving within the monitored zone. These configurations allow for a closer working relationship between a human and robot since the systems can precisely identify the relative locations between the human and robot in a three-dimensional space, and can be used in dynamic workplaces where the human and robot may move across a range of trajectories. Moreover, the three-dimensional exclusion zones may be constantly adapted based on a real-time position and movement velocity of the robot and the human. While these systems have several advantages over two-dimensional designs, they are typically computationally intensive and rely on knowing the precise position and movement velocity of the robot in three-dimensional space. Accordingly, for this design to function properly, the robot data must be reliable and accurate to ensure the exclusion zone protects the human working adjacent the robot.

In many conventional designs, robots include encoders for determining position and movement velocity for the robot and all robot joints. As discussed above, position and velocity information is integral for ensuring the safety of a shared workspace because this information is used in conjunction with a robot's three-dimensional modeling and kinematics to define where the robot is in space, and where it will be in the near future. With this information, it is possible to define a three-dimensional exclusion zone that can accurately track a position of the robot at all times and ensure that a human worker is safe while working within a close vicinity of the robot. The information can also be used to create an exclusion zone that anticipates potential collisions based on the position of the human and the future position of the robot. While this position and velocity data is typically retrievable from the robot controller via standard communication interfaces (e.g., an ethernet interface), the data itself is prone to inaccuracies and reliability issues for various reasons, such as: the failure to use encoder redundancies in the robot design, the potentially unsafe nature of the communication interface from which the data is retrieved, and the failure of robot manufacturers to expose position and velocity information in a safe manner.

Accordingly, the present inventors have identified a need for a system and method capable of independently verifying the position and velocity robot data to ensure proper calculation of an exclusion zone and that the workspace between the human and robot is safe. Additional aspects and advantages of such methods will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 3 is a block diagram illustrating a workspace monitoring system in accordance with one embodiment.

FIG. 4 is a block diagram illustrating a method in accordance with one embodiment for verifying robot positioning data obtained from sensors of the workspace monitoring system as compared to the data obtained from the robot controller.

DETAILED DESCRIPTION OF DISCLOSED EMBODIMENTS

Figure 1:
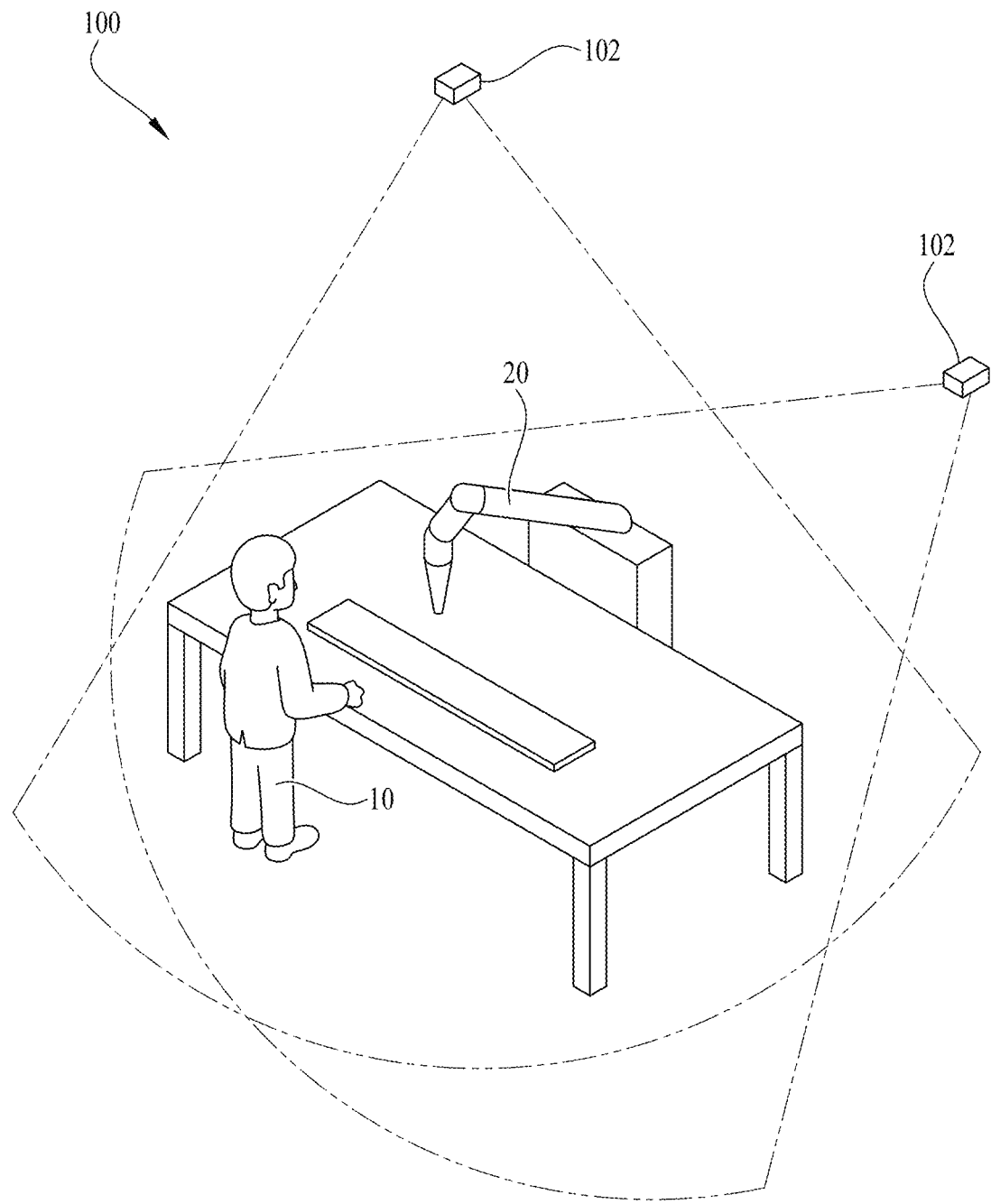
FIG. 1 is a schematic illustration of a monitored shared workspace in accordance with one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe the disclosed subject matter in the context of monitoring a workspace shared between a human and a robot to protect personnel and reduce the likelihood of inadvertent injuries. It should be understood that these references are merely example uses for the described systems and methods and should not be considered as limiting. The techniques described herein apply not only to robots in a workspace, but also to any form of dangerous automated machinery, including such machinery for which a minimum safe separation distance may vary over time due to movements of the machine. Moreover, in other embodiments, the concepts described herein may be adapted for uses in other arrangements that may differ from the workspace examples described herein.

In the field of robotics, ISO 10218 and ISO/TS 15066 provide speed and separation guidelines for ensuring a safe workspace between an industrial robot and a human worker. Risk of injury to the human worker may be reduced in these environments by monitoring the workspace to ensure a protective separation distance, also referred to as an exclusion zone, is maintained at all times between the human and robot as they move about the workspace. In some configurations, the exclusion zone may be calculated using data obtained directly from the robot and combined with data obtained from sensors observing movement of the human and robot in the workspace. When the calculated separation distance, as determined by the monitoring system, between the robot and the human decreases below a threshold value, the robot system may be slowed down, stopped, or have its trajectory path altered to avoid injury to the human.

As noted previously, there are various suitable methods for calculating the exclusion zone based on robot data and movement parameters. However, all of these methods rely on the integrity and accuracy of the robot data, including position, velocity, and movement trajectory. All of this robot data is obtained directly from the robot itself, such as via a robot controller. While this information is critical in calculating an exclusion zone for satisfying the safety guidelines, information obtained from the robot controller is prone to inaccuracies that may lead to unsafe conditions. The following disclosure relates specifically to systems and methods for independently verifying the robot data and ensuring that the robot data is reliable to ensure that the exclusion zones have been calculated accurately.

FIGS. 1-14 collectively illustrate details relating to systems and methods for monitoring a workspace shared between a human and a robot using one or more sensors positioned about the workplace. The following discussion provides a brief overview of the disclosure followed by a more detailed discussion of the disclosed embodiments with specific reference to the figures.

With general reference to the figures, the sensors monitoring the workspace are arranged so as to minimize occluded regions and to obtain as complete of a three-dimensional view as possible of the workspace shared between the human and robot. Raw data from each of the sensors is obtained and analyzed to determine the spatial relationship between the human and robot as both the human and robot move throughout the workspace. This sensor data is used to determine a three-dimensional position of the robot from the perspective of the sensors, which is then compared to the positional data obtained directly from the robot controller to ensure that the robot data is reliable and accurate. In the case where the position information from the sensors does not match the data from the robot controller, the system would then deactivate the robot for safety purposes.

Turning now to the figures, FIG. 1 schematically illustrates an example workspace 100 shared by a person 10 and a robot 20 (or another suitable machine). In the workspace 100, the person 10 and the robot 20 may work collaboratively, or may operate independently, or alternate between the two working arrangements. The workspace 100 is monitored by one or more sensors 102 arranged to collectively cover and monitor the workspace 100, particularly those regions of the workspace 100 where the person 10 and robot 20 interact collaboratively. The sensors 102 may be any suitable sensors capable of monitoring the workspace 100. In one embodiment, the sensors 102 are capable of obtaining three-dimensional images or other data for use to determine a spatial relationship between the person 10 and robot 20 in three-dimensional space. For example, in some embodiments, the sensors 102 may include three-dimensional time-of-flight cameras, stereo vision cameras, three-dimensional LIDAR sensor or other radar-based sensors.

The workspace 100 may include any number of sensors 102 needed to ensure the sensors 102 collectively monitor the target regions of the workspace 100 as desired. Preferably, the sensors 102 are arranged to minimize or avoid occlusions to the extent possible to effectively monitor the workspace 100 with fewer sensors 102. After arranging the sensors 102 around the workspace 100, their position relative to one another may be registered by comparing images as between the sensors to ensure proper calibration and coverage of the workspace 100, and to retrieve the relative position and orientation between the sensors 102 and the base of the robot 10. The calibration step may be used to identify occlusions or static objects in the sensor field-of-view to ensure those objects are accounted for and not considered in future analysis steps. With the sensors 102 properly calibrated relative to one another, the data can be reliably used to monitor the workspace 100.

Figure 2:
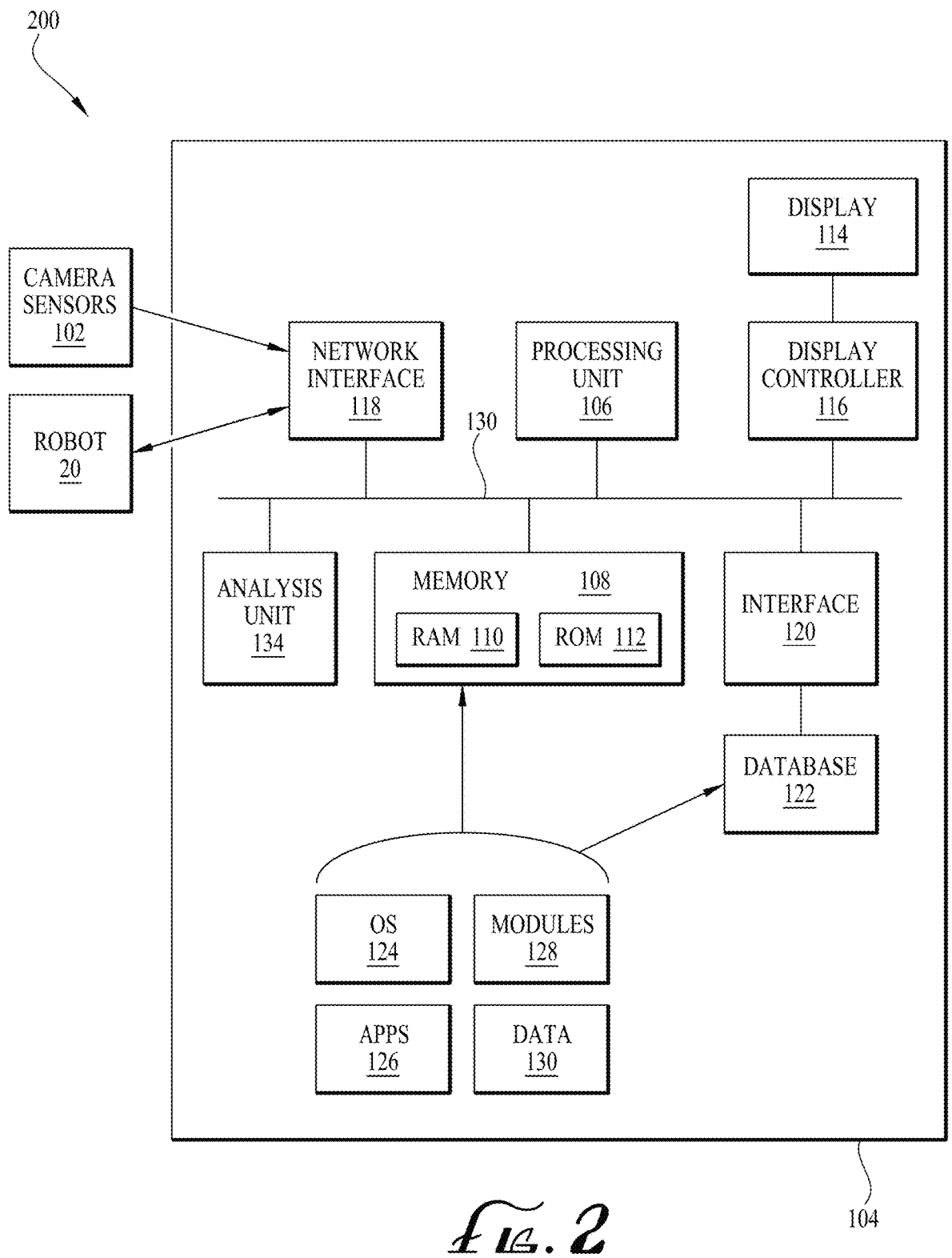
FIG. 2 is a block diagram illustrating an example control system for a workspace monitoring system in accordance with one embodiment.

FIG. 2 is a block diagram illustrating components for an example control system 104 for a workspace monitoring system 300 (see FIG. 3) in accordance with one embodiment. With reference to FIG. 2, data from each sensor 102 monitoring the workspace 100 is received by the control system 104. The regions monitored and covered by each sensor 102 may be represented in any suitable form of volumetric representation. The control system 104 includes a central processing unit (CPU) 106 which may be any of various suitable commercially available processors or other logic machine capable of executing instructions. In other embodiments, suitable dual microprocessors or other multi-processor architectures may also be employed as the processing unit 106. The control system 104 further includes memory 108 which may be implemented using one or more standard memory devices. The memory devices may include, for instance, RAM 110, ROM 112, and EEPROM devices, and may also include magnetic or optical storage devices, such as hard disk drives, CD-ROM drives, and DVD-ROM drives. The memory 108 contains instructions stored therein for controlling operation of the CPU 106 and its interactions with other components of the control system 104. In some embodiments, the control system 104 may include a display 114 driven by a display controller 116.

The control system 104 further includes a network interface 118 to communicate with and receive data from the sensors 102. The network interface 118 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be incorporated to facilitate a WAN networking environment. The control system 104 may also include an interface 120 coupled to a database or internal hard drive 122. Interface 120 may also be coupled to removable memory, such as flash memory, a magnetic floppy disk drive, an optical disk drive, or another drive. Further, the interface 120 may be configured for external drive implementations, such as over a USB, IEEE 1194, or PCMCIA connection.

In one embodiment, any number of program modules may be stored in one or more drives 122 and RAM 110, including an operating system 124, one or more application programs 126, or other program modules 128 (such as instructions to implement the methods described herein), and data 130. All or portions of the program modules may also be cached in RAM 110. Any suitable operating system 124 may be employed, such as Windows Embedded CE, Windows Embedded Handheld, Windows Desktop, Android, Linux, iOS, MacOS, or other commercially available or proprietary operating systems.

The above-described components, including the processing unit 106, memory 108, display controller 116, network interface 118, and interface 120 may be interconnected via a bus 130. While a bus-based architecture is illustrated in FIG. 2, other types of architectures are also suitable (e.g., one or more components may be directly coupled to one another). While the illustrated embodiment depicts one possible configuration of a control system 104, it should be recognized that a wide variety of hardware and software configurations may be provided. For example, other embodiments may have fewer than all of these components or may contain additional components.

As noted previously, data from the sensors 102 monitoring the workspace 100 is received by the control system 104 via any suitable communications means, such as the network interface 118, and stored in memory 108 for processing by an analysis module 134. The analysis module 134 may employ conventional computer-vision techniques, such as deep-learning algorithms, to analyze the data from the sensors 102 and distinguish between humans and automated robots or other workpieces. As is further described below, the analysis module 134 may be programmed to analyze the data from the sensors 102 to determine the minimum distance from the robot 20 at which it must detect a person 10 to stop operation of the robot 20 and avoid potential injury to the person 10. Additional details relating to the processing steps undertaken by the analysis module 134 of the control system 104 are detailed below with specific reference to FIGS. 4-14.

To establish a general frame of reference, the following briefly describes an example method for determining an exclusion zone via a workspace monitoring system 300 and monitoring the workspace 100 to ensure safety distances determined by the exclusion zone are maintained. FIG. 3 is a schematic diagram illustrating general details of a workspace monitoring system 300 for determining an exclusion zone for ensuring the safety of a person 10 when working in a workspace 100 with a robot 20 in accordance with one embodiment. As described previously, sensors 102 monitor the workspace 100, where the sensors 102 continuously capture position data relating to the robot 20 and the person 10. The sensors 102 provide real-time information that is analyzed by the analysis module 134 to identify the three-dimensional location of the robot 20 and the person 10, and determine whether the person 10 is located a safe distance away from the robot 20.

As mentioned previously, all aspects of the robot's movement, such as range of motion, movement pattern, and velocity, are governed by a robot controller 302. The robot controller 302 also determines the instantaneous state of the robot 20, including the current orientation of any robot links or joints, their respective movement patterns, and velocities. The robot controller 302 also includes all instructions relating to the robot model that controls the behavioral aspects of the robot throughout its operational sequence.

In one example method for determining an exclusion zone, the analysis module 134 of the control system 104 first obtains data from the sensors 102 and uses this information to identify the location of the person 10, the location of the robot 20, and other objects of interest in the workspace 100. The analysis module 134 (or other component of the control system 104) also communicates (either directly or indirectly) with the robot controller 302 via the network interface 118 or any suitable wireless or wired communication protocols to obtain information relating to the robot model and robot data relating to the movement of the robot 20 and the planned trajectory of the robot 20. With the robot data and the sensor data, along with the safety parameters set forth by the exclusion zone, the analysis module 134 is able to assess whether the person 10 has or will enter the exclusion zone. If the analysis module 134 determines that the person 10 and the robot 20 are on a collision course, the control system 104 may communicate with the robot controller 302 to take a safe action, such as by deactivating the robot 20, slowing down the robot 20, or altering the movement pattern of the robot 20 to avoid the collision.

As mentioned previously, it is critical that the analysis module 134 and the control system 104 receive reliable and accurate data from the robot controller 302 to both determine a proper exclusion zone with an adequate safety margin to anticipate and avoid potential collisions, and to monitor the workspace 100 to ensure the exclusion zone is not breached by the person 10. With general reference to FIGS. 4-14, the following describes systems and methods for comparing robot positional and movement data obtained from the robot controller 302 with the data obtained from the sensors 102 to ensure the robot data is accurate and reliable for maintaining a safe working environment between the person 10 and robot 20 in the workspace 100. As is described in more detail below, the systems and methods are generally based on a comparison between a three-dimensional representation of the workspace 100 as constructed primarily from the robot data from the robot controller 302 and from the data obtained from the sensors 102.

FIG. 4 is a block diagram illustrating a method 400 in accordance with one embodiment for verifying robot positioning data obtained from sensors 102 of the workspace monitoring system 300 as compared to the data obtained from the robot controller 302. In the method 400 described herein, reference is made to the sensors 102 being camera sensors, and the methodology including an arrangement using two such camera sensors. It should be understood that the following methodology may be adjusted to apply equally to configurations using a single sensor or configurations using more than two sensors, or to systems using sensors other than three-dimensional cameras. In addition, as mentioned previously, reference is made to the use of the method 400 (and also method 500 of FIG. 13) in conjunction with a robot 20. It should be understood that a robot 20 is one example embodiment and that the methods 400, 500 may be used in connection with any other dangerous machinery. Accordingly, reference below in the methods 400, 500 relating to the use of robot models and other suitable robot positioning data broadly incorporates the concept of using machine models and machine positioning data when the methods 400, 500 are applied in the connection with any dangerous machinery other than robots.

With reference to FIG. 4, at step 402, data relating to camera intrinsic and extrinsic parameters is received as input by the analysis module 134 for each sensor. The intrinsic camera parameters include internal data fixed to a particular camera/digitization configuration to allow for an accurate mapping between camera coordinates and pixel coordinates in the image frame. The extrinsic camera parameters include external data and provide the location and orientation (or pose) of the camera as it monitors the workspace 100. At step 404, data relating to the robot model is also received as input by the analysis module 134. The robot model includes information pertaining to movement of the robot 20, such as the shape, degrees of freedom, and actuation of the robot joints (illustrated as a manipulator arm in FIGS. 5-12), and can also include models of any components attached to the robot 20, such as a gripper, end effectors, and payload. This data may be represented using any suitable format for representing a robot model, such as Unified Robot Description Format (URDF), or other formats. At step 406, robot TF tree data is received as input by the analysis module 134. This data contains the current spatial transformation (or pose) of every robot link of the robot 20 operating in the workspace 100, and includes information relating to the current joint angles of robot links. The data from the robot may be stored in any suitable memory unit (not shown) associated with the robot, such as a storage drive, a database, a removable memory, or any other suitable units, where the data is accessible via communication between the controller 302 and analysis module 134.

Figure 5:
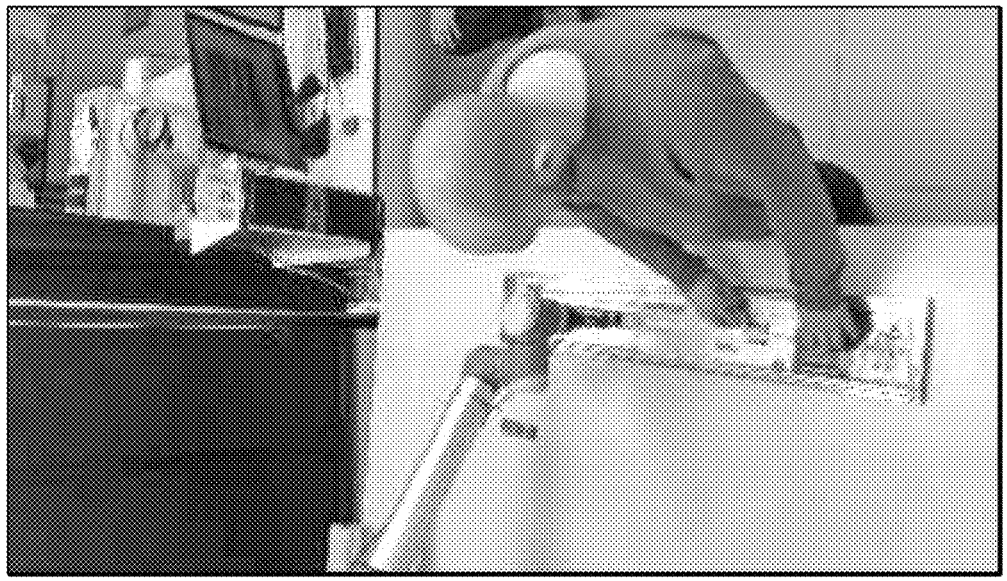
FIGS. 5-6 illustrate representative RGB images obtained from the sensors monitoring the workspace in accordance with one embodiment.
Figure 6:
Figure 7:
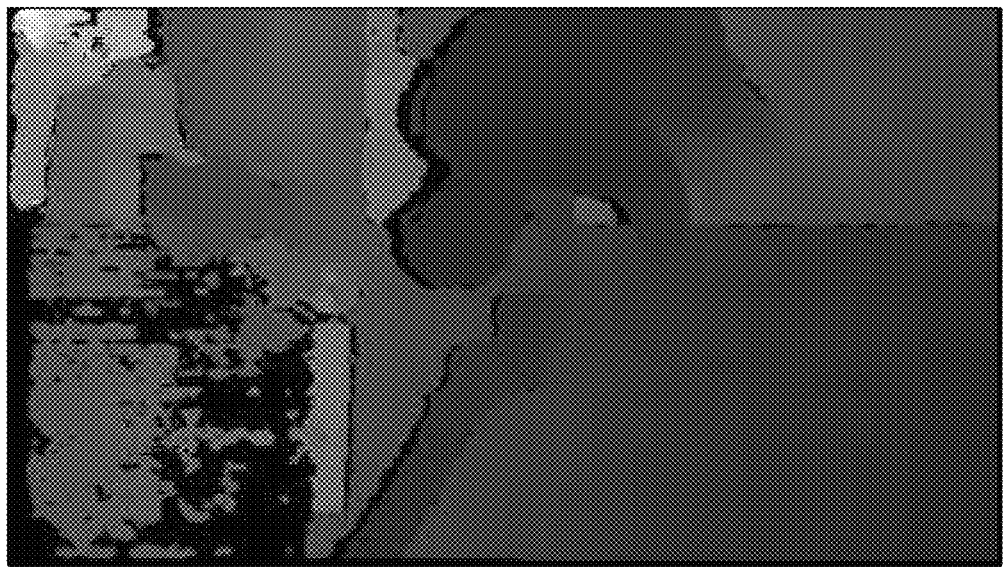
FIGS. 7-8 illustrate example depth maps containing depth information for the objects present in the workspace in accordance with one embodiment.
Figure 8:

At step 408, the first camera (sensor 102) acquires a first set of data based on its field-of-view of the workspace 100, and the second camera (sensor 102) acquires a second set of data based on its field-of-view of the workspace 100. In some embodiments, the first set of data and the second set of data may include one or more RGB images of the workspace 100. FIGS. 5 and 6 illustrate reference RGB images from the cameras 102 monitoring the shared workspace 100. It should be understood that in other embodiments, the first and second sets of data may include other formats depending on the type of sensors being used. For example, in other embodiments, the sensors 102 may be capable of directly outputting depth maps without the need for or use of RGB images. The data from the cameras is received as input by the analysis module 134 and processed to generate a first depth map, $d_1$, associated with the first camera and a second depth map, $d_2$, associated with the second camera. In other embodiments where the sensors 102 are capable of directly outputting depth maps, the analysis module 134 may instead directly acquire from the sensors 102 the first depth map, $d_1$, associated with the first camera and a second depth map, $d_2$, associated with the second camera rather than needing to generate the depth maps from the sensor data. In either case, the analysis module 134 receives depth maps either by generating them itself (or via another component of the control system 104) or by receiving them directly from the sensors 102. Example depth maps, $d_1$ and $d_2$, generated from the camera sensors 102 are illustrated in FIGS. 7 and 8. Generally speaking, a depth map is a grayscale image that illustrates the distance between various objects in the image and the camera. Accordingly, every pixel in the depth maps, $d_1$ and $d_2$, contains information relating to the depth distance from the respective camera of all the objects in the image. In the depth maps, $d_1$ and $d_2$, objects or surfaces that are closer to the respective camera are darker than those that are further away from the respective camera. This depth information allows for the ultimate determination of a relative three-dimensional position for all captured points in the monitored space. Any pixel in the image without an associated depth measurement is assigned an unknown value. It should be understood that for systems using more than two cameras, the analysis module 134 may generate or otherwise acquire a depth map for each camera sensor based on its respective field-of-view in a similar fashion as described above.

Figure 9:
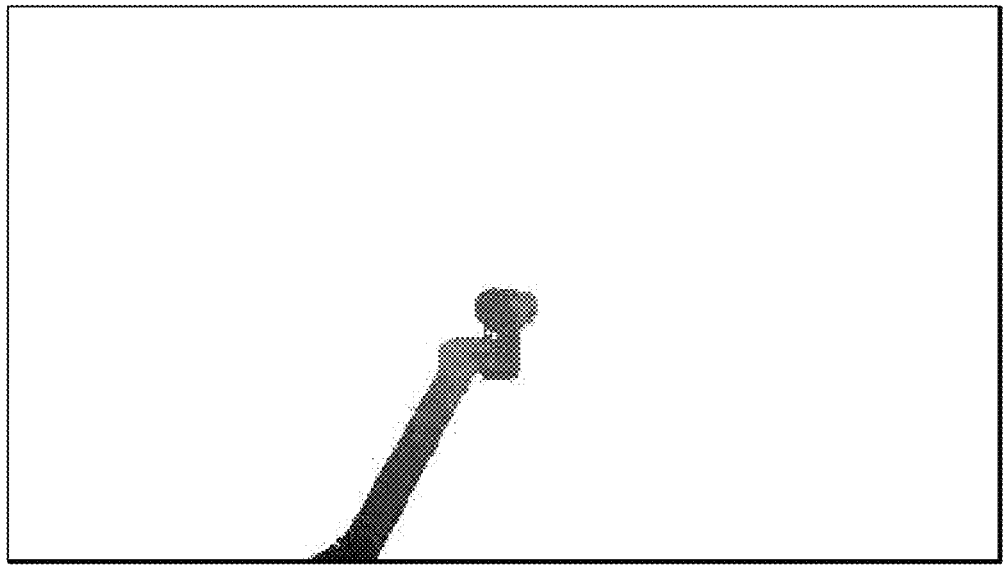
FIGS. 9-10 illustrate example synthetic depth maps generated from sensor parameters and robot data in accordance with one embodiment, where the depth maps are created from the perspective of the sensors.
Figure 10:
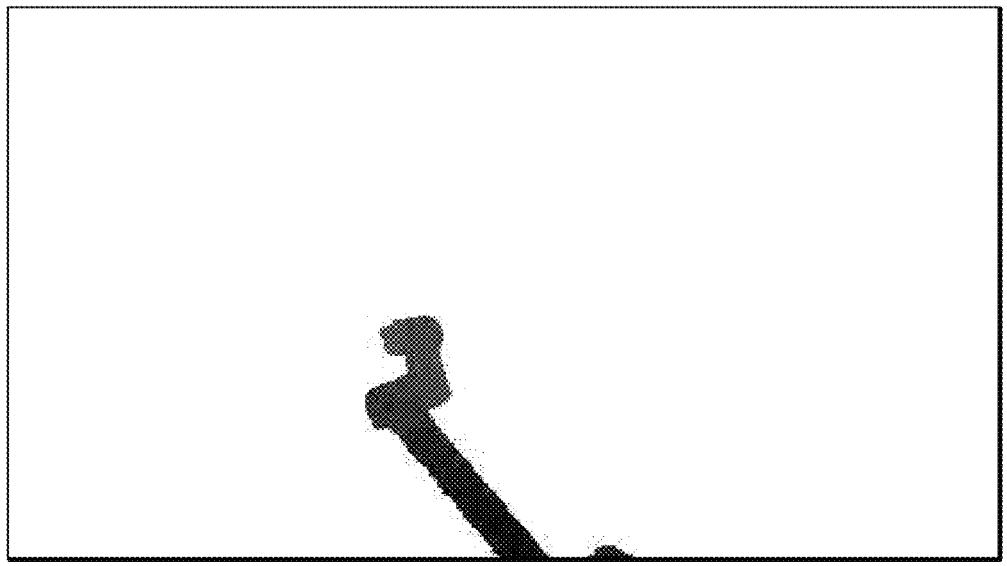
Figure 11:
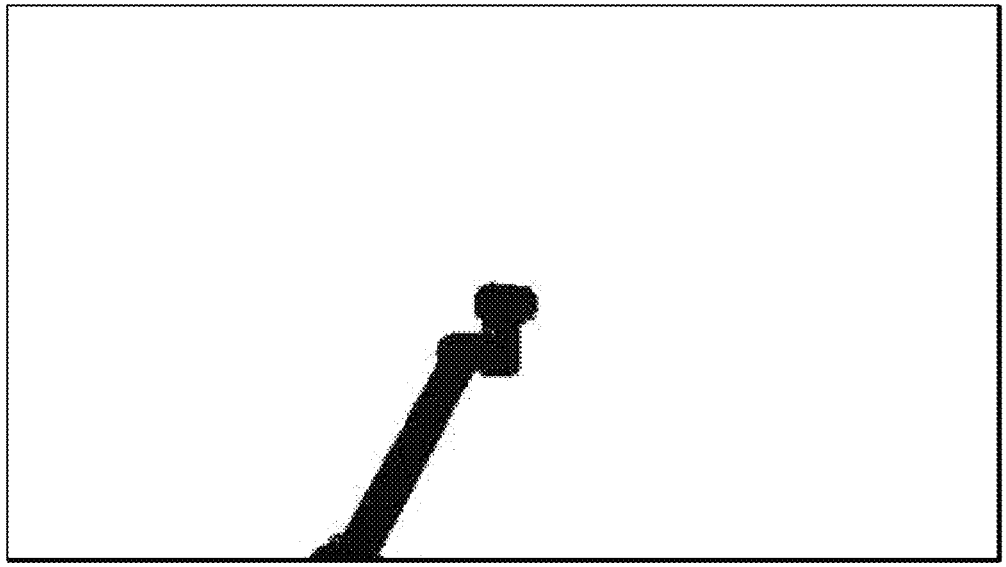
FIGS. 11-12 illustrate example robot binary masks for identifying all pixels associated with a robot from the depth maps of FIGS. 7-8 in accordance with one embodiment.
Figure 12:
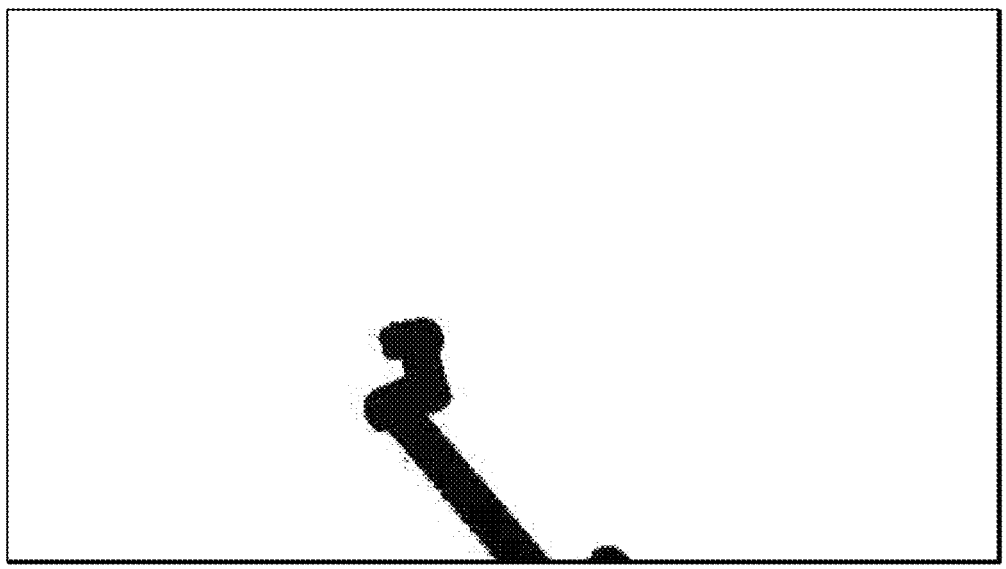

At step 410, the analysis module 134 generates two synthetic depth maps, $sdr_1$ and $sdr_2$, from the camera intrinsic and extrinsic parameters input at step 402, the robot model information input at step 404, and the current position information from the robot TF tree input at step 406. Briefly, the robot TF tree is a series of three-dimensional spatial transformations that describe the position in the space of every link of the robot 20. The synthetic depth maps, $sdr_1$ and $sdr_2$, contain robot pixel information and are created from the perspective of the first and second cameras (using the camera parameters) to simulate the vision of the first camera and the second camera, respectively. Example synthetic depth maps, $sdr_1$ and $sdr_2$, are illustrated in FIGS. 9 and 10. The synthetic depth maps, $sdr_1$ and $sdr_2$, in FIGS. 9 and 10 only illustrate robot information since they are generated using primarily robot data. In the synthetic depth maps, invalid values are assigned to any object in the image frame that is not part of the robot. In the images illustrated in FIGS. 9 and 10, all invalid values are represented with white color.

At step 412, the analysis module 134 generates a first synthetic binary mask, $sb_1$, to retrieve only the pixels associated with the robot from the first depth map, $d_1$, and generates a second synthetic binary mask, $sb_2$, to retrieve only the pixels associated with the robot from the second depth map, $d_2$. All other pixels in the depth maps, $d_1$ and $d_2$, may be assigned invalid depth values and represented in a common color to simplify the comparison. For example, in FIGS. 11 and 12, all pixels not associated with the robot are assigned a white color.

At step 414, the analysis module 134 compares the valid robot pixel depths between the first depth map, $d_1$, and the corresponding robot pixel depths in the first synthetic depth map, $sdr_1$. Similarly, the analysis module 134 compares the valid robot pixel depths between the second depth map, $d_2$, and the corresponding robot pixel depths in the second synthetic depth map, $sdr_2$, to determine whether any significant differences in the respective depth values is present. Identification of all valid pixels in the depth maps, $d_1$ and $d_2$, may be obtained from the binary masks, $sb_1$ and $sb_2$, generated at step 412. In some embodiments, following the comparison, the analysis module 134 may calculate a first match rate between the valid robot pixels of the first depth map, $d_1$, and the first synthetic depth map, $sdr_1$, and a second match rate between the second depth map, $d_2$, and the second synthetic depth map, $sdr_2$. The match rates indicate the degree of overlap between the valid robot pixel depths in the depths maps, $d_1$ and $d_2$ as compared to the synthetic depth maps $sdr_1$ and $sdr_2$.

At step 416, if no significant differences are found in the comparisons, that is, if the match rates for one or both comparisons at step 414 satisfy or exceed a predefined threshold, the verification process passes, meaning that the data obtained from the sensors 102 (and represented in the depth maps) is coherent with the robot data obtained from the robot controller 302 (and represented in the synthetic depth maps). On the other hand, if the analysis module 134 finds any significant differences in the data comparison, that is, one or both match rates do not exceed the predefined threshold, then the verification process fails. The predefined threshold for the match rates may be dependent on the quality and resolution of the sensor data. In some embodiments, the threshold may be empirically determined from the results obtained comparing the data during normal operation when the robot is known to be outputting correct positional data. For example, in such embodiments, the predefined threshold may be determined to be a little below the maximum difference obtained during proper operation of the robot.

In other embodiments, the analysis module 134 may have an allowed depth value discrepancy stored therein between a pixel of the synthetic depth map, $sdr_1$ and the depth map, $d_1$. A pixel comparison that exceeds this depth value discrepancy will result in an invalid match. The dimensioning of this parameter is especially related to sensor accuracy and precision (i.e., 4 cm). In some embodiments, the match rate may be calculated as a percentage of all the pixel points considered in the analysis in view of the total number of pixels belonging to the robot as calculated via the synthetic robot mask, $sb_1$. In other words, the match rate can be determined as the number of matching robot pixels as determined by the comparison step 414 of the depth map $d_1$ and the synthetic depth map $sdr_1$, with that total of matching pixels then divided by the total number of robot pixels from the synthetic robot mask, $sb_1$ and finally multiplied by 100 to obtain a match rate percentage. The same match rate analysis is applied for all depth map $d_n$ and the synthetic depth map $sdr_n$ comparisons that are being analyzed. Preferably, the match rate percentage for each comparison ranges between 90-100% for the verification process to pass. In other embodiments, the match rate may be lower, such as at least 80%.

Upon a verification failure, the analysis module 134 (or other component of the controller unit 112) may send a signal to the robot controller 302 to take an appropriate action, such as to deactivate the robot 20, slow down the robot movement, or take any other suitable action to alter the robot's trajectory and minimize the risk of potential injury to the person 10.

As mentioned previously, the method 400 may be adjusted for use with a single sensor or for use with more than two sensors. For methods 400 employing a single sensor, such as a single camera 102, the method 400 described herein may be adjusted accordingly to use the data from the single camera 102. For example, in those embodiments, at step 408, only a single depth map, such as $d_1$, is generated. Similarly, at step 410, only a single synthetic depth map, such as $sdr_1$, is generated and at step 412, only a single synthetic binary mask, $sb_1$, is generated. At step 414, the analysis module 134 compares the valid robot pixel depths between the single depth map, $d_1$, and the corresponding robot pixel depths in the single synthetic depth map, $sdr_1$. Finally, at step 416, the analysis module 134 evaluates whether there are significant differences in the comparison to determine whether the verification process passes or fails as described above.

It should be understood that a similar adjustment to the method 400 may be made to accommodate a configuration with more than two sensors. In other words, for configurations using n sensors, the method 400 is adjusted to generate n depth maps, $d_n$, n synthetic depth maps, $sdr_n$, and n synthetic binary mask, $sb_n$. The comparison step 414 and the evaluation step 416 follow in a similar fashion as discussed above using the n depth maps, $d_n$, n synthetic depth maps, $sdr_n$, and n synthetic binary masks, $sb_n$.

Figure 13:
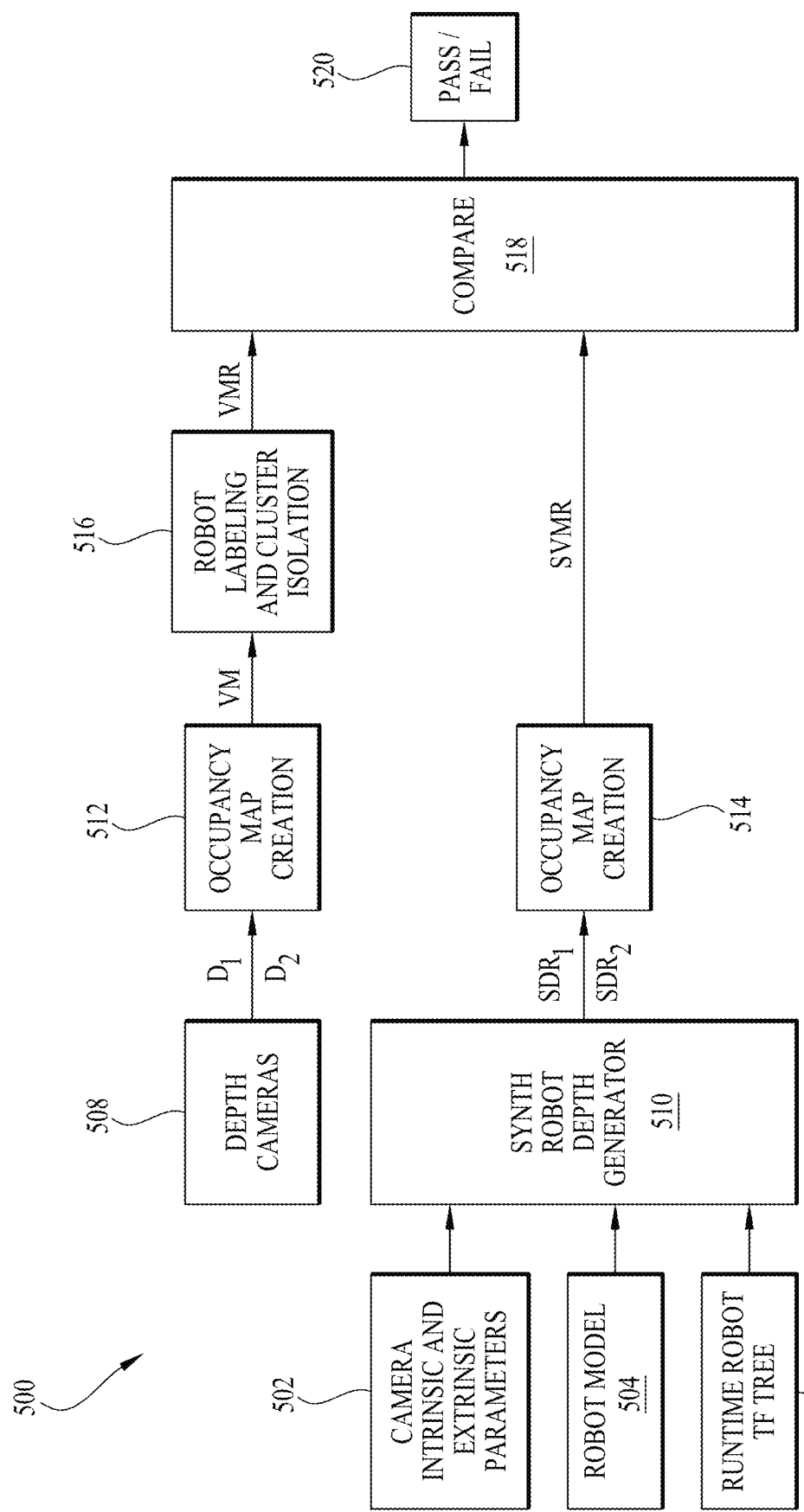
FIG. 13 is a block diagram illustrating a method in accordance with another embodiment for verifying robot positioning data obtained from sensors of the workspace monitoring system as compared to the data obtained from the robot controller.

FIG. 13 is a block diagram illustrating a method 500 in accordance with another embodiment for verifying robot positioning data obtained from sensors 102 of the workspace monitoring system 300 as compared to the data obtained from the robot controller 302. The method 500 includes various similar steps described previously with reference to the method 400. Accordingly, the following description may briefly reference those steps to establish an appropriate frame of reference but may not provide additional detail to avoid repetition with the understanding that the relevant information described in the method 400 applies equally to the corresponding steps in the method 500.

With reference to FIG. 13, at step 502, data relating to camera intrinsic and extrinsic parameters is received as input by the analysis module 134. At step 504, data relating to the robot model is also received as input by the analysis module 134. At step 506, robot TF tree data containing the current spatial transformation (pose) of every robot link of the robot 20 operating in the workspace 100 is received by the analysis module 134. At step 508, the analysis module 134 generates or acquires a first depth map, $d_1$, and a second depth map, $d_2$, based on the respective camera fields-of-view of the workspace 100. For reference, the depth maps described at step 508 are similar to those described at steps 408 of the method 400 and illustrated in FIGS. 7 and 8. At step 510, the analysis module 134 generates two synthetic depth maps, $sdr_1$ and $sdr_2$, using the camera intrinsic and extrinsic parameters input at step 502, the robot model information input at step 504, and the current position information from the robot TF tree input at step 506. As described previously, the synthetic depth maps, $sdr_1$ and $sdr_2$, simulate the vision of the first and second cameras, respectively, relying primarily on the measurements associated with the robot data retrieved from the robot and the camera parameters.

At step 512, the analysis module 134 generates a first three-dimensional occupancy map, vm, using the collective data from the depth maps, $d_1$ and $d_2$. At step 514, the analysis module 134 generates a second three-dimensional occupancy map, svmr, using primarily the robot data obtained from the robot controller 302 along with the camera intrinsic and extrinsic parameters. At step 516, a robot labeling and cluster isolation algorithm is used to process the first three-dimensional occupancy map, vm, and isolate just the cluster of points (or voxels) belonging to the robot to produce an occupancy map, vmr, containing only the robot data isolated from the occupancy map, vm, created using the camera information.

At step 518, the analysis module 134 compares the two three-dimensional occupancy maps vmr and svmr to determine a match rate and identify any significant differences between the occupancy maps. At step 520, if no significant differences are found between the occupancy maps, that is the match rate satisfies or exceeds a predetermined threshold, the verification process passes, which means that the data obtained from the cameras is coherent with the robot data obtained from the robot controller 302. If the analysis module 134 finds any significant differences in the comparison, that is the match rate does not meet the predefined threshold value, then the verification process fails and the analysis module 134 (or other component of the controller unit 112) may send a signal to the robot controller 302 to deactivate the robot 20 or take any other suitable action to avoid potential injury.

In some embodiments, the match rate may be calculated based on the maximum number of robot voxels between the two three-dimensional occupancy maps, vmr and svmr, as the occupancy maps may contain clusters with two different number of robot voxels. For example, the first occupancy map, vmr, may identify 210 voxels as belonging to the robot whereas the second occupancy map, svmr, may identify 200 voxels. In this example, we would then need to determine the number of robot voxels in the first occupancy map, vmr, that are also present in the second occupancy map, svmr. That total of matching voxels is then divided by the maximum number of robot voxels between vmr and svmr (in this case 210) and finally multiplied by 100 to obtain a match rate percentage. Preferably, the match rate percentage ranges between 90-100% for the verification process to pass. In other embodiments, the match rate may be lower, such as at least 80%.

Figure 14:
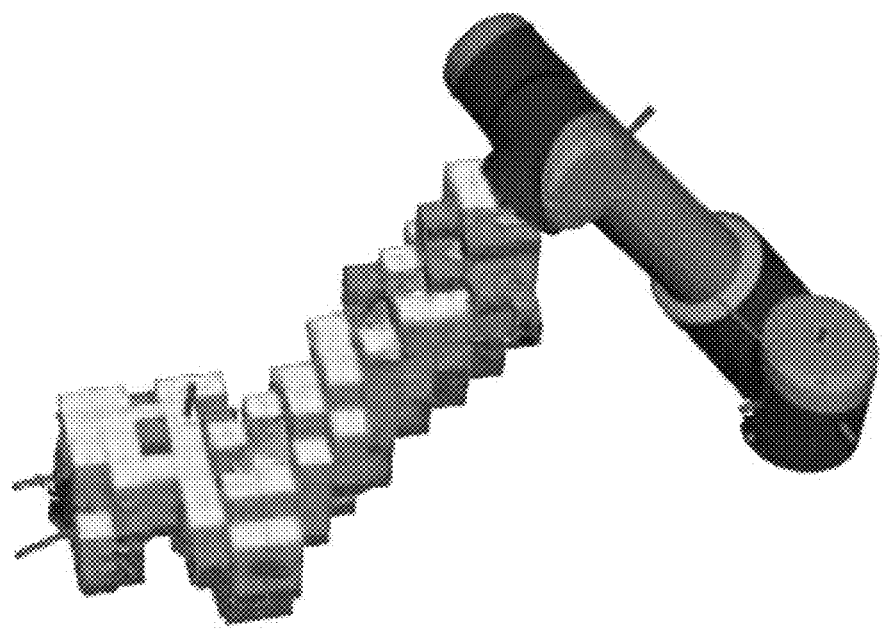
FIG. 14 illustrates an example of overlayed occupancy maps for verifying the accuracy of a robot clustering process associated with the method of FIG. 13.

In some embodiments, the method 500 may also be used to confirm that the robot labeling process has been done correctly to ensure that the robot cluster used in the analysis contains just the points belonging to the robot. For example, FIG. 14 illustrates the overlayed occupancy maps for a manipulator arm of the robot 20. The darker segments illustrate the occupancy map, vmr, derived from the depth maps, $d_1$ and $d_2$, using the camera sensors 102, and the lighter segments illustrate the occupancy map, svmr, generated from the robot data. It should be noted that in FIG. 14, only a portion of the robot is seen from the cameras (voxels are covering just a portion of the robot. This overlayed approach would lead to a detection failure, where no distinction between robot clustering and person clustering is found, indicating that the person 10 is likely touching a portion of the robot 20.

As mentioned previously, the systems and methods described herein may be used to verify that all data obtained from the robot is accurate and reliable, since that data is commonly used to create an exclusion zone for worker safety in workspaces shared by a human and robot. Moreover, the systems and methods described herein may also be used to detect inconsistencies between the data provided by the cameras and the robot (or another suitable machine). In some cases, these inconsistencies may not be created by unreliable robot data, but may instead result from changes in the intrinsic or extrinsic parameters of the cameras monitoring the workspace 100, or from other issues relating to camera (or other sensor) performance, such as a position change of the camera or an optical window occlusion. Since the cameras are used to monitor the position of the person 10 and the robot 20 and detect whether the person 10 is present within the exclusion zone, it is important that the data from the cameras monitoring the workspace 100 is also consistent and reliable. Accordingly, a failure to verify the data using the disclosed systems and methods may also be used to identify potential issues with camera performance. In other words, if a verification failure is found, both the robot data and the camera data may be analyzed to determine the source of the discrepancy. In such embodiments, the analysis module 134 (or other suitable component of the control system 104) may incorporate diagnostic tools to determine whether the cameras (or other sensors) are malfunctioning and to attempt resolving the issue.

For example, in some embodiments, the analysis module 134 may communicate with the cameras 102 to determine sensor functionality since various factors may impact performances of the cameras. For example, a change in camera pose could result from vibration during use, as cameras are usually mounted on metal supports, or could result from external forces, such as repositioning by a human. Thermal heat generated from continued use may create temporary expansion in some camera components, leading to a physical change in camera focal length or CMOS/CCD sensor expansion causing image deterioration. Mechanical stress from continuous use or other physical damage may also impact sensor performance. In addition, sensor module non-rigidity may cause sensor optics to shift, such as tilting the sensor downward can cause a non-rigid focus lens to move. As such, the analysis module 134 may take any appropriate action to resolve sensor functionality issues, such as: (a) verifying the status of intrinsic or extrinsic parameters as compared to baseline or factory calibration; (b) verifying a position of the camera as compared to an initial or reference position obtained during system calibration; (c) determining whether an optical window occlusion is present; (d) or taking any other measures necessary to resolve the issue. Depending on the issue, the analysis module 134 (or other component of the control system 104) may take suitable action, such as sending a signal to the cameras 102 to adjust a position of the cameras 102 to avoid the occlusion or to reposition the camera to the initial or reference position, or to recalibrate the intrinsic or extrinsic parameters as needed.

In some embodiments, certain of the steps described above in steps 400 and 500 may be combined, altered, varied, and/or omitted without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method for verifying machine data used in a system monitoring a workspace during real-time operation of a machine within the workspace, the method comprising:
receiving, via an analysis module, a set of data from each of one or more sensors, wherein the one or more sensors are arranged to monitor the workspace including a machine, and wherein the set of data for each sensor of the one or more sensors includes position information for the machine in the workspace relative to a position of the respective sensor for each of the one or more sensors;
receiving, via the analysis module, a depth map based on the set of data for each sensor of the one or more sensors, resulting in one or more depth maps, wherein each depth map contains machine depth pixels relating to a captured position of the machine within the workspace;
receiving, via the analysis module, a set of parameters associated with each sensor of the one or more sensors;
receiving, via the analysis module, machine data from the machine including position information for the machine;
generating, via the analysis module, a synthetic depth map using the set of parameters associated with each sensor of the one or more sensors and the machine data, resulting in one or more synthetic depth maps, wherein each synthetic depth map contains machine pixel information simulated from a perspective of each sensor of the one or more sensors; and
communicating, via the analysis module, a signal to the machine to alter a machine action responsive to a data verification failure determined during real-time operation of the machine based on a comparison of the machine depth pixels derived from each depth map for each sensor of the one or more sensors and the machine pixel information derived from the synthetic depth map for the corresponding sensor of the one or more sensors.

2. The method of claim 1, further comprising:
comparing, via the analysis module, the machine depth pixels for each depth map with corresponding machine depth pixels for each synthetic depth map to determine a match rate for each comparison; and
wherein the step of communicating, via the analysis module, the signal to the machine is further based on the match rate for each comparison.

3. The method of claim 2, wherein each set of parameters associated with each sensor of the one or more sensors includes: (a) intrinsic parameters including internal sensor data fixed to a sensor configuration to allow for an accurate mapping between sensor coordinates and pixel coordinates in the image frame; and (b) extrinsic parameters including a location and orientation of each sensor of the one or more sensors relative to the machine in the workspace.

4. The method of claim 2, further comprising generating, via the analysis module, a corresponding synthetic binary mask to retrieve only the machine depth pixels associated with the machine from each depth map.

5. The method of claim 2, wherein the machine data includes: (a) a machine model that includes information relating to degrees of freedom and actuation of the machine; and (b) machine movement information containing a current spatial pose for one or more links of the machine.

6. The method of claim 2, further comprising communicating, via the analysis module, with a corresponding sensor of the one or more sensors to evaluate sensor performance based on the match rate for the comparison of the depth map and the synthetic depth map related to the corresponding sensor.

7. The method of claim 1, further comprising:
generating, via the analysis module, a first three-dimensional occupancy map from the one or more depth maps;
generating, via the analysis module, a second three-dimensional occupancy map from the one or more synthetic depth maps; and
comparing, via the analysis module, the first three-dimensional occupancy map and the second three-dimensional occupancy map to determine a match rate,
wherein the step of communicating, via the analysis module, the signal to the machine is further based on the match rate.

8. The method of claim 7, further comprising applying, via the analysis module, a machine clustering process to the first three-dimensional occupancy map to isolate a cluster of pixels in the first three-dimensional occupancy map containing only machine occupancy data.

9. A system for verifying machine data used in monitoring a workspace during real-time operation of a machine within the workspace, the system comprising:
one or more sensors arranged to monitor the workspace including a machine, wherein each sensor of the one or more sensors obtains a set of data, and wherein the set of data for each sensor of the one or more sensors includes position information for the machine in the workspace relative to a position of the respective sensor for each of the one or more sensors;
an analysis module in operable communication with each sensor of the one or more sensors, the analysis module configured to receive the set of data, wherein the analysis module is further operable to:
receive a depth map based on the set of data for each sensor of the one or more sensors, resulting in one or more depth maps, wherein each depth map contains machine depth pixels relating to a captured position of the machine within the workspace;
receive a set of parameters associated with each sensor of the one or more sensors;
receive machine data from the machine including position information for the machine;
generate a synthetic depth map using the set of parameters associated with each sensor of the one or more sensors and the machine data, resulting in one or more synthetic depth maps, wherein each synthetic depth map contains machine pixel information simulated from a perspective of each sensor of the one or more sensors; and communicate a signal to the machine to alter a machine action responsive to a data verification failure determined during real-time operation of the machine based on a comparison of the machine depth pixels derived from each depth map for each sensor of the one or more sensors and the machine pixel information derived from the synthetic depth map for the corresponding sensor of the one or more sensors.

10. The system of claim 9, wherein the analysis module is further operable to:

compare the machine depth pixels for each depth map with corresponding machine depth pixels for each synthetic depth map to determine a match rate for each comparison; and wherein the step of communicating, via the analysis module, the signal to the machine is further based on the match rate for each comparison.

11. The system of claim 9, wherein each set of parameters associated with each sensor of the one or more sensors includes: (a) intrinsic parameters including internal sensor data fixed to a sensor configuration to allow for an accurate mapping between sensor coordinates and pixel coordinates in the image frame; and (b) extrinsic parameters including a location and orientation of each sensor of the one or more sensors relative to the machine in the workspace.

12. The system of claim 9, wherein the analysis module is further operable to generate a corresponding synthetic binary mask to retrieve only the machine depth pixels associated with the machine from each depth map.

13. The system of claim 9, wherein the machine data includes: (a) a machine model that includes information relating to degrees of freedom and actuation of the machine; and (b) machine movement information containing a current spatial pose for one or more links of the machine.

14. The system of claim 9, wherein the analysis module is further operable to communicate with a corresponding sensor of the one or more sensors to evaluate sensor performance based on the match rate for the comparison of the depth map and the synthetic depth map related to the corresponding sensor.

15. The system of claim 9, wherein the analysis module is further operable to:

generate a first three-dimensional occupancy map from the one or more depth maps;

generate a second three-dimensional occupancy map from the one or more synthetic depth maps; and compare the first three-dimensional occupancy map and the second three-dimensional occupancy map to determine a match rate, wherein the signal to the machine is further based on the match rate.

16. The system of claim 15, wherein the analysis module is further operable to apply a machine clustering process to the first three-dimensional occupancy map to isolate a cluster of pixels in the first three-dimensional occupancy map containing only machine occupancy data.

17. A system for verifying machine data used in monitoring a workspace during real-time operation of a machine within the workspace, the system comprising:

a machine disposed in the workspace, the machine including a memory unit having stored machine data relating to position information for the machine, wherein the machine data further includes: (a) a machine model that includes information relating to degrees of freedom and actuation of the machine; and (b) machine movement information containing a current spatial pose for one or more links of the machine;

one or more sensors arranged to monitor the workspace and the machine, wherein each sensor of the one or more sensors obtains a set of data, and wherein the set of data for each sensor of the one or more sensors includes position information for the machine in the workspace relative to a position of the respective sensor for each of the one or more sensors, the one or more sensors each further including a set of parameters associated therewith; and an analysis module in operable communication with each sensor of the one or more sensors and with the machine, the analysis module configured to receive the machine data from the machine and the set of data and set of parameters from each of the one or more sensors, wherein the analysis module is further operable to:

generate a depth map from the set of data for each sensor of the one or more sensors, resulting in one or more depth maps, wherein each depth map contains machine depth pixels relating to a captured position of the machine within the workspace;

generate a synthetic depth map using the set of parameters associated with each sensor of the one or more sensors and the machine data, resulting in one or more synthetic depth maps, wherein each synthetic depth map contains machine pixel information simulated from a perspective of each sensor of the one or more sensors; and communicate a signal to the machine responsive to a data verification failure determined during real-time operation of the machine based on a comparison of the machine depth pixels derived from each depth map for each sensor of the one or more sensors and the machine pixel information derived from the synthetic depth map for the corresponding sensor of the one or more sensors, wherein upon receipt of the signal from the analysis module, the machine alters a movement action for one or more of the one or more links of the machine.

18. The system of claim 17, wherein the analysis module is further operable to compare the machine depth pixels for each depth map with corresponding machine depth pixels for each synthetic depth map to determine a match rate for each comparison, and wherein the signal to the machine is further based on the match rate for each comparison.

19. The system of claim 18, wherein the analysis module is further operable to communicate with a corresponding sensor of the one or more sensors to evaluate sensor functionality based on the match rate for the comparison of the depth map and the synthetic depth map related to the corresponding sensor.

20. The system of claim 17, wherein the analysis module is further operable to:

generate a first three-dimensional occupancy map from the one or more depth maps;

generate a second three-dimensional occupancy map from the one or more synthetic depth maps; and compare the first three-dimensional occupancy map and the second three-dimensional occupancy map to determine a match rate, wherein the signal to the machine is further based on the match rate.

* * * * *